United States Patent
Giles et al.

(10) Patent No.: US 8,467,735 B2
(45) Date of Patent: Jun. 18, 2013

(54) METHODS AND APPARATUS FOR TESTING AND INTEGRATION OF MODULES WITHIN AN ELECTRONIC DEVICE

(75) Inventors: Michael Jason Giles, San Jose, CA (US); Camille Chen, Cupertino, CA (US); Lei Li, San Jose, CA (US); Michael A. Robinson, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 630 days.

(21) Appl. No.: 12/409,245

(22) Filed: Mar. 23, 2009

(65) Prior Publication Data
US 2010/0240317 A1    Sep. 23, 2010

(51) Int. Cl.
*H04B 17/00*    (2006.01)

(52) U.S. Cl.
USPC ..................................... 455/67.11; 455/67.13

(58) Field of Classification Search
USPC ............................................ 455/63.11, 63.13
See application file for complete search history.

(56) References Cited

U.S. PATENT DOCUMENTS

| | | | | |
|---|---|---|---|---|
| 6,941,110 | B2* | 9/2005 | Kloper et al. | 455/67.11 |
| 7,099,674 | B2* | 8/2006 | Diao et al. | 455/453 |
| 2004/0028003 | A1* | 2/2004 | Diener et al. | 370/319 |

* cited by examiner

Primary Examiner — Tuan T Lam
(74) Attorney, Agent, or Firm — Gazdzinski & Associates, PC

(57) ABSTRACT

Methods and apparatus for analysis of electronic components such as radio transceivers (for example, WLAN, Bluetooth, cellular, GPS). In one embodiment, a "black box" is diagnosed in its final device application and layout, using a series of software test routines or suites. The test suites provide simultaneous monitoring of multiple non-overlapping status indicators. Each test suite can be selectively enabled or disabled, and may also provide runtime modification of one or more parameters, and or intelligent testing of system operation. In another embodiment, multiple black box modules within a single form factor device are simultaneously run; the interference levels between the black box modules (as well as other parameters) are independently measured, displayed and logged to the user. Exemplary embodiments are described in reference to a Bluetooth module and WLAN module operating within a spatially restricted device (such as a desktop/laptop computer, "smartphone", Bluetooth mouse and keyboard).

21 Claims, 10 Drawing Sheets

METHODS AND APPARATUS FOR TESTING AND INTEGRATION OF MODULES WITHIN AN ELECTRONIC DEVICE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of troubleshooting consumer electronics devices. More particularly, in one exemplary aspect, the present invention is directed to methods and apparatus adapted to diagnose encapsulated component device issues in situ, caused by a wide variety of unpredictable variables such as device specific layouts, usage environments, and user configurations.

2. Description of Related Technology

Next generation computerized devices focus on offering consumers a substantially unified solution for a variety of services to which consumers have become accustomed. Examples of such converged solutions include the exemplary "MacBook Air" laptop computer, and iPhone™ each manufactured by the Assignee hereof. For instance, the iPhone™ has the capability of, among other things, sending and receiving email over a wireless LAN (WLAN) network, making and receiving calls using a GSM or 3G cellular network, and operating wireless peripheral equipment (such as wireless headsets) using the Bluetooth (BT) protocol. These devices are also ideally made as small and lightweight as possible so that users may carry them on their person, briefcase, or the like with ease, thereby even further enhancing the user's experience and freedom.

Unlike application-specific consumer products having relatively singular functionality (e.g., a simple mobile phone, laptop, Personal Digital Assistant (PDA), etc.), next generation convergence products are typically not optimized for any single element or function. Instead, such convergence products incorporate a wide variety of "black boxed" third party solutions which were in many cases not particularly developed for use in the convergence device. When these ad hoc components are assembled or combined with other similar components into a host convergence product, the performance of these components (and even the device as a whole) is in many cases significantly worse than advertised by the original manufacturers. This stems in large part from the fact that the individual components were designed for and tested in a generalized (non-converged) environment.

Moreover, in some cases, performance degradation severely hampers operation of one or more aspects of the host device in completely unexpected or unpredictable ways. This type of effect can be particularly acute in platforms that integrate multiple wireless air interfaces (e.g., cellular, WLAN, and PAN such as Bluetooth).

Many third party components are substantially "encapsulated" (e.g., have a fixed or impermeable nature, and/or may be substantially immutable in terms of various aspects or their operation or physical properties). Characteristically, such encapsulated solutions contain proprietary material which is in whole (or in part) hidden from system integrators, such as the manufacturer of the converged host device. While some third party manufacturers may provide limited test access into the encapsulated module, comprehensive source code (e.g., application code, Register Transfer Language (RTL)) is generally not provided. Rather, these components are typically tested in isolation within a highly controlled laboratory environment under predetermined environmental conditions.

Furthermore, there are some instances where internally developed designs (i.e., those developed by the converged device manufacturer or integrator) are likewise substantially fixed or immutable. For instance, "encapsulation" may occur when portions of past designs are reused to save on development time and or redesign. In many cases, while the reused section is not hidden or inaccessible per se, the system integration engineers of the module cannot alter source code or RTL. They must instead "make do" with the module as an aggregate whole.

In other another common development paradigm, multiple product lines may derive portions of their design from a single database. In this case, a change to the encapsulated module would affect other design teams and would be in most cases prohibited.

Therefore, while such encapsulated components offload much of the design burden from the engineering staff of the converged device manufacturer or integrator, it is appreciated that the lack of visibility into the internal workings of such black box component may mask a plethora of development issues or "bugs". Common development bugs may be caused for example by a wide variety of unpredictable variables (such as e.g., specific converged device layouts, other component present within the design, usage environments, and user configuration), but are at least initially assumed to be an artifact of the interface or co-existence between the encapsulated component and its environment.

Extant techniques for evaluating and diagnosing problems associated with such third party encapsulated devices when actually installed within the host converged device are also quite unwieldy. Many of these traditional approaches are based on a trial-and-error approach and utilize significant amounts of specialized test equipment and engineering time, and also cannot generally be performed in situ ("in the field, or in the device"), but rather only in specialized laboratory or manufacturer settings. For instance, existing approaches to debugging such issues might include: (i) switching integrated circuits (e.g., Bluetooth transceivers or servers) so that all such ICs are from the same vendor, thereby ostensibly increasing compatibility; (ii) using high-end test equipment such as network analyzers, oscilloscopes, spectrum analyzers, packet tracers, etc. to test component or device performance; (iii) adding ancillary test or diagnosis hardware or the like (e.g., adding a test pin in a Bluetooth antenna connector to measure the return loss ($S_{11}$) parameter using a network analyzer); and/or (iv) measuring antenna pattern(s) in anechoic chamber.

Based on the foregoing, improved methods and apparatus are needed for diagnosing such "encapsulated" component device issues in situ. Such methods and apparatus would ideally provide troubleshooting capabilities suited to debug or evaluate the operation of potentially problematic components within the host platform, as well as the aggregated or converged host in a more holistic manner.

Such improved methods and apparatus might also serve to improve overall engineering efficiency by providing greater visibility within encapsulated components, and improve deployment and maintenance efficiency.

Lastly, the improved methods and apparatus should be flexible in its implementation, and ideally capable of interoperation with multiple converged device types.

SUMMARY OF THE INVENTION

The present invention satisfies the foregoing needs by providing, inter alia, methods and apparatus for evaluating and debugging electronics devices such as converged platforms.

More particularly, in one exemplary aspect, the present invention is directed to methods and apparatus adapted to diagnose component or device issues in situ, such issues being caused for example by the wide variety of unpredictable variables such as device specific layouts, usage environments, and user configurations.

In a second aspect of the invention, computer readable apparatus having a storage medium is disclosed. In one embodiment, the medium comprises at least one computer program having a plurality of instructions associated therewith, the at least one radio transceiver test program comprising: a monitoring module configured to monitor at least one radio transceiver parameter; a traffic module configured to determine at least one data traffic parameter; and at least one of a signal generation or signal receiver module configured to cause generation or reception of a radio frequency signal, respectively.

In one variant, the monitoring module is configured to monitor at least one of: (i) Adaptive Frequency Hopping (AFH) channel mapping, (ii) relative or raw received signal strength indication (RSSI), or (iii) transmit power associated with the radio transceiver.

In another variant, the traffic module is configured to initiate the transmission of traffic over the radio transceiver.

In yet another variant, the radio transceiver comprises a Bluetooth compliant transceiver, and the initiation of transmission of traffic comprises causing sending Asynchronous Connectionless Link (ACL) data packets over an L2CAP connection.

In a further variant, the traffic module is further configured to monitor log the data rate associated with the transmission of the traffic.

In still another variant, the at least one of a signal generation or signal receiver module comprises a signal generation module configured to initiate a single tone transmission, the generation module further comprising a function enabling manual selection of transmission power level. The at least one of a signal generation or signal receiver module further comprises a signal receiver module configured to initiate a single tone receiving mode, and monitor the RSSI associated with at least one received signal.

In a further variant, the apparatus further comprises a platform noise measurement module configured to collect platform noise data.

In yet another variant, the radio transceiver comprises a Bluetooth compliant transceiver, and the apparatus further comprises a module configured to set one or more parameters associated with the transceiver. The one or more parameters comprise for example: (i) transmitter power level, and (ii) Bluetooth discovery mode.

In a third aspect of the invention, a method for debugging a converged electronic device comprising a plurality of functional modules is disclosed. In one embodiment, the method comprises: initiating at least two substantially separate test processes, each of the at least two test processes adapted to interface to at least two corresponding modules selected from the first plurality of modules; placing the at least two test processes in data communication with the at least two corresponding modules, respectively; and presenting the at least two test processes within a user interface simultaneously.

In one variant, the converged device comprises a device having an at least partly metallic housing, and the plurality of modules comprise at least two heterogeneous wireless interfaces. The at least two heterogeneous wireless interfaces might comprise for example a WLAN interface and at least a Bluetooth interface.

In a fourth aspect of the invention, a method of diagnosing performance issues relating to a wireless interface within an electronic device is disclosed. In one embodiment, the method comprises: performing a baseline test of the device regarding at least one aspect of the wireless interface; if the baseline test fails, then performing at least one of: (i) a receiver sensitivity test; (ii) a device noise test; or (iii) an antenna pattern or sensitivity test.

In one variant, the electronic device comprises a computer program configured to run on a processor of the electronic device and perform the baseline test and at least one other test (i)-(iii) by at least accessing one or more indigenous test suites associated with the wireless interface.

In another variant, the electronic device comprises a WLAN interface, and the method further comprises performing a WLAN co-existence test.

In a further variant, the receiver sensitivity test comprises using a second device having a wireless interface capable of communicating data with the wireless interface of the device being tested to transmit a signal at a known power level.

In yet another variant, the antenna pattern or sensitivity test comprises placing a housing of the device in various operational configurations.

In still another variant, the antenna pattern or sensitivity test comprises placing a second device having a wireless interface capable of communicating data with the wireless interface of the device being tested in various angular dispositions relative to the device being tested, and recording received signal data relating to the dispositions.

In a fifth aspect of the invention, an electronic apparatus adapted to perform multivariate analysis of at least one operational function is disclosed. In one embodiment, the apparatus comprises: a first module, the first module performing the at least one operational function; a user interface; a processing device in operative communication with the first module and user interface; and a computer readable apparatus in data communication with the processing device, the computer readable apparatus comprising media having a computer program with a plurality of instructions. When executed on the processing device, the program: enables at least two substantially separate test processes, each of the at least two test processes adapted to interface with portions of the first module; activates at least one of the at least two test processes for the first module; and presents output generated by the at least one activated test process within the user interface.

In a sixth aspect of the invention, a converged device adapted for in situ diagnosis is disclosed. In one embodiment, the device comprises: a display device; a processor; a wireless interface in data communication with the processor, the wireless interface comprising a manufacturer-specific test function associated therewith; and a storage device in data communication with the processor and having at least one computer program stored thereon. When run on the processor, the program: accesses the test function to perform at least one physical layer test function and at least one application layer test function on at least portions of the wireless interface; performs at least one system level test of the device; and provides the results of the at least one physical and application layer test functions and the at least one system level test to a user via the display device.

In one variant, the wireless interface comprises a Bluetooth compliant interface, and the at least one physical layer test function comprises an RSSI test.

In a seventh aspect of the invention, a method of doing business relating to an electronic device is disclosed. In one embodiment, the method comprises: providing an electronic device having at least one wireless interface to a user for consideration; utilizing an application program running on the electronic device to perform in situ diagnosis of component- or system-level issues relating to operation of the interface; and correcting the at least one of the issues based at least in part on the diagnosing.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
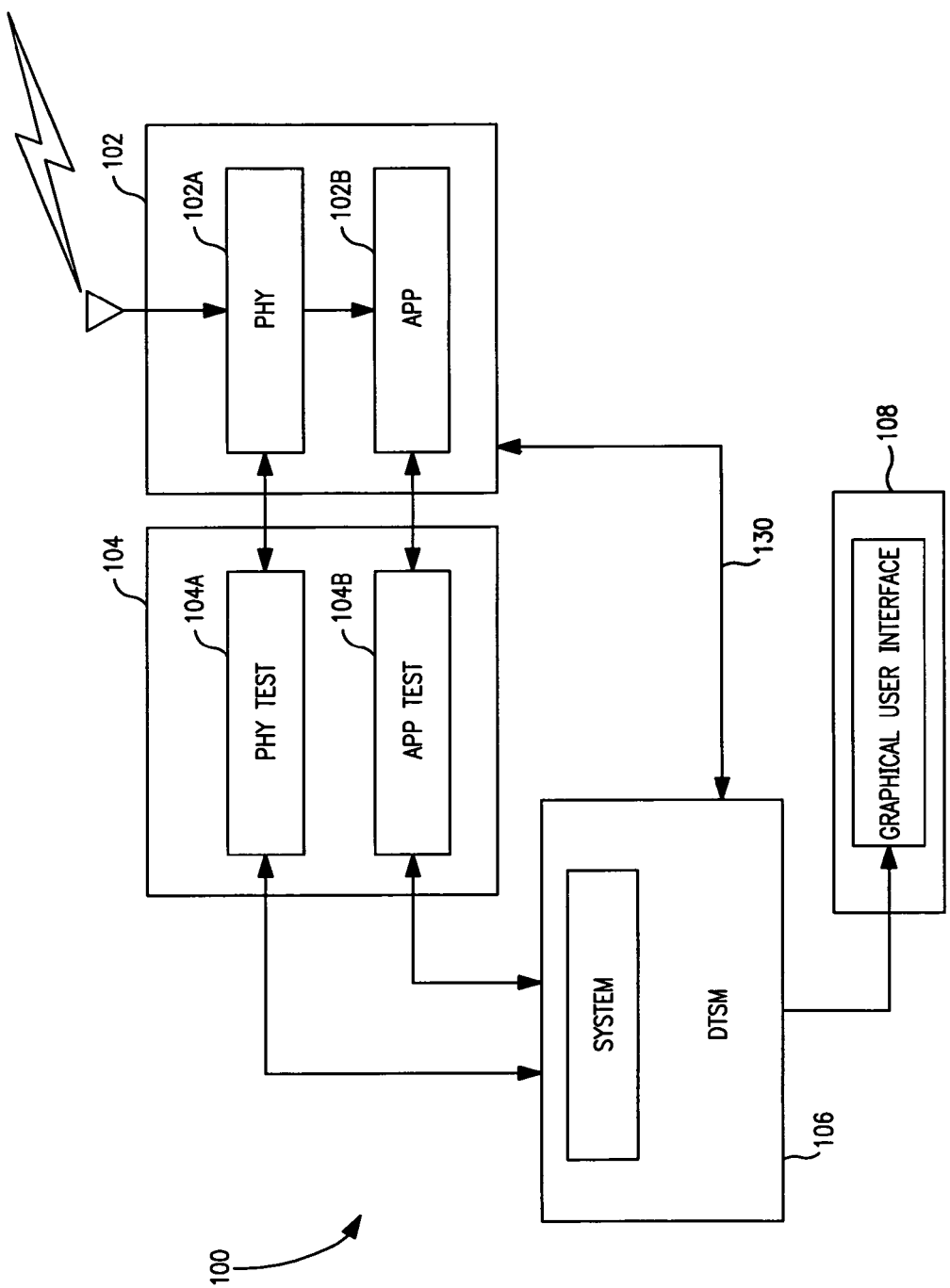
FIG. 1 is a block diagram illustrating one embodiment of a software architecture comprising a functional software stack coupled to a Diagnostic Test Suite Manager (DTSM), in accordance with the principles of the present invention.

Reference is now made to the drawings, wherein like numerals refer to like parts throughout.

Overview

The present invention discloses, inter alia, methods and apparatus that facilitate the system level integration of "encapsulated" and other components. Such encapsulated or "black box" components can only feasibly be analyzed (or it may only be desirable to analyze them even if accessible) by comparing their inputs, and outputs to expected values. In one embodiment, such components include various radios and or modems which both emit, and are sensitive to, electromagnetic radiation. Specifically, methods and apparatus are disclosed for use with "converged" electronic device that integrate multiple encapsulated components such as wireless modems within aggressive form factors that may preclude standard invasive test strategies (e.g. insertion of test points, dissection of component hardware, etc.). These methods and apparatus are non-intrusive, and obviate having to dissemble the device under test to debug it (i.e., the device under test can advantageously be treated as a "black box" if desired).

Furthermore, in various embodiments of the invention, the multiple encapsulated subsystems may be simultaneously monitored and tested. Previously unforeseen bugs related to "non-ideal" operation (e.g. interoperability or interference between components, platform noise, external interferes, etc.) may thus be diagnosed.

In one exemplary embodiment of the invention, a Diagnostic Test Suite Manager (DTSM) application program consolidates, controls and displays the aggregate system status from a suite of encapsulated component test functions. Each test function or suite can access and reflect several indicia of the health of each component's functional software stack. The test suites are adapted to interface to a Bluetooth module. Multiple simultaneous component analyses allows concurrent monitoring and testing of neighboring wireless interfaces (e.g. WLAN, GSM or 3G cellular modems). In one such test, a platform noise test operatively measures interference between the Bluetooth module, and its neighboring Wi-Fi™ device. In another example of enhanced test capabilities, higher-level software can simulate true Bluetooth traffic while simultaneously monitoring multiple status indicia.

In one salient aspect of the invention, the Diagnostic Test Suite Manager enables multivariate analysis of performance and stability problems. Problems within hardware and software implementations such as wireless modems are commonly manifested in multiple areas at once. Multivariate analysis provides a quick assessment of an encapsulated system (such as a Bluetooth module) by providing critical status indicia at each layer of its software stack. In one exemplary embodiment, an exemplary Bluetooth module is monitored and tested at a physical (PHY) layer, an application layer, and also at a system level.

In another aspect, methods and apparatus for in situ testing of an encapsulated module are disclosed. Testing apparatus are disclosed for analysis of an encapsulated module in the absence of expensive test equipment. Specifically, testing of encapsulated modules leverages existing software and hardware fixtures to identify and diagnose problematic behavior. Extant hardware and software test apparatus (e.g., manufacturer specific test functions such as measurements for receiver sensitivity, noise floor, isolation, throughput, transmit power, AFH map statistics, channels above a settable noise threshold, radio timeline view, etc.) are used within the DTSM application framework.

The improved methods and apparatus also advantageously provides multiple degrees of debugging capability from multiple engineering disciplines, thus reducing the engineering resources necessary to resolve problems. Such multivariate analysis of bugs greatly expedites bug discovery and resolution. By minimizing engineering staff and test equipment required for costly debugging efforts, these resources can be funneled to more profitable ventures and new product development. Ready access to diagnostic tools for troubleshooters and field technicians (and even end users or consumers) is also provided.

The improved methods and apparatus are also highly flexible in their implementation, and capable of interoperation with multiple converged device types. The cost of individually supporting extensive test suites for multiple converged devices scales up quickly. Most product lines have distinct capabilities and necessarily different layouts, device populations and use case scenarios. The exemplary DTSM described herein flexibly supports multiple test devices with minimal additional design burdens by leveraging existing debugging solutions for encapsulated components, within a broader diagnostic framework. In fact, many incipient product designs have no test pins at all, an instead rely solely on DTSM as a debugging solution.

DETAILED DESCRIPTION OF EXEMPLARY EMBODIMENTS

Exemplary embodiments of the present invention are now described in detail. While these embodiments are discussed primarily in the context of a device incorporating a Bluetooth transceiver, it will be recognized by those of ordinary skill that the present invention is not so limited. In fact, the various aspects of the invention are useful in any device utilizing one or more substantially stand-alone or "encapsulated" solutions that can benefit from the in situ and/or dynamic monitoring of its systems and components as is disclosed herein.

Furthermore, exemplary embodiments of the diagnostic utilities as disclosed herein may comprise an amalgamation of multiple independent test modules or tools. Accordingly, it is appreciated that the methods and apparatus of the invention may be readily adapted to operate with multiple heterogeneous "black box" devices (e.g., Wi-Fi™, GSM, 3GPP/3GPP2 cellular, WiMAX, Ultra Wideband (UWB), MobileTV, Wireless USB, RFID, etc.), each of which may additionally support its own independent test suite.

While the exemplary embodiment is discussed specifically in relation to Bluetooth transceivers, it is appreciated that various aspects of the present invention will find significant use in any Personal Area Network (PAN). Such technologies may include without limitation IrDA, Ultra-WideBand (UWB), IEEE Std. 802.15, Z-Wave, ZigBee, etc.

Example Problem Case—Bluetooth Technology—

Wireless technology such as Bluetooth has been utilized in many consumer electronics systems, including converged devices such as the exemplary MacPro, iMac, Mac-mini, MacBook family (MacBook, MacBook Air, MacBook Pro), and Bluetooth Human Interface Devices such as mice and keyboards (each manufactured by the Assignee hereof). As used herein, the term "Bluetooth" refers without limitation to any device, software, interface or technique that complies with one or more of the Bluetooth technical standards, including Bluetooth Core Specification Version 1.2, Version 2.0, and Version 2.1+EDR.

In traditional designs, the integration of Bluetooth transceiver or modem modules within product form factors was relatively simple. Bluetooth modules were primarily a commodity; consequently, sub-modules were compact and feature-optimized. Access to dedicated test hardware (e.g., exposed pins and antenna connectors) in the modules was not a significant constraint to the overall design. Recent changes to industrial design methodologies have mandated greater restrictions on space, and in some cases the use of metallic device casings. These factors are especially troublesome for wireless components, which rely on radio isolation, and clear transmission/reception to minimize power consumption and computational complexity.

While some problems are specific to wireless transceivers or modems, there are many unknowns when any system is first designed. Some generic problems are encountered by any electronics design; for example, regions in the immediate vicinity of certain components may be "noisy". Common examples of such noise include artifacts caused by clock harmonics, switching power supplies, and data bus broadband noise. These electromagnetic (EM) radiation effects are often highly specific to each design layout.

Encapsulated components (such as Bluetooth modules, antennas, etc.) are designed and tuned to meet individual component requirements. Nearby EM radiation issues can cause wireless devices to perform unexpectedly or with reduced efficiency, and sometimes not at all. Even more limiting is the fact that as converged platform designs continue to shrink, issues associated with EM radiation progressively become worse (e.g., due to $1/r^2$ spreading), and helpful debug points may often disappear. Thus, engineering budgets for system integration of even highly commoditized and simple sub-modules (such as Bluetooth) has become extremely challenging. For example, prototypes incorporating Bluetooth modems may have difficulty passing even minimum throughput performance requirements. In some designs, co-located Bluetooth modems cannot communicate with one another effectively due to severe platform noise levels.

As previously described, the difficulty in debugging such converged designs is exacerbated by the apparent "blind spots" inherent to black box/encapsulated components. Each module vendor builds their corresponding portion of the component (e.g., Bluetooth module and antennas), individually testing their portions for module level functionality. These component pieces are assembled and tested by a system vendor. The system vendor performs a baseline or other fairly minimal test to check the functionality of the system, typically comprising a quick file transfer protocol (FTP) test or the like. A device which fails this baseline check is sent back to the system designer for further debug. Module vendors can verify that their designs work properly in isolation; however, the aggregate system is very different from the noiseless environment of the test laboratory.

The debugging of such pre-fabricated components in situ can be very difficult. The internal design of each module and its corresponding source code is generally proprietary and/or obfuscated. In most cases, the system must be debugged by analyzing the inputs and outputs of the sub-modules with significant assumptions or conjecture involved (as well as much trial-and-error). Where possible, test suites provided by module vendors and test equipment manufacturers can be used. Independent development of internal test programs by the designer may also feasibly be performed. The amalgamation of tests, test suites and equipment provide information to varying degrees of detail.

Unfortunately, some test or diagnostic software components are disorganized, and may require intimate knowledge to operate. Even more troubling is that initial "triage" attempts to diagnose the root cause of a problem may incorrectly identify areas or subcomponents of the faulty module. Such misdiagnosis can lead to reduce efficiency and selection of inappropriate engineering resources to assist in debugging. Furthermore, even when correctly diagnosed, expert staff may need to be gathered on a bug-by-bug basis.

Such "guess-and-check" approaches may work in a laboratory environment where there are sufficient test equipment resources and multiple engineers from different disciplines (e.g., RF, software, hardware, and systems engineers for a Bluetooth-related issue). Nevertheless, it is clearly complicated and inefficient. Even with a fully equipped lab, and significant engineering expertise on hand, solving even trivial bugs can be a time consuming process. Future trends will only worsen this effect, as radio transceivers and other modules will continue to shrink in size and coalesce in their disposition within a given host device or system. Newer designs will consolidate the Bluetooth modem with its antenna without using a RF connector. For example, the MacBook Pro (manufactured by the Assignee) does not have enough space for an RF connector. In fact, the BT module and antenna are mounted to the device housing lid, with very little "clearance". Furthermore, although intrusive test equipment may have better accuracy and capabilities, the intrusive nature of the test equipment itself may change the nature of the problem and exacerbate diagnosis. For example, an internal antenna may be cut, and an external connector soldered on for connection to a spectrum analyzer. This change to the RF circuit may drastically change the perceived test results. Even the physical presence of the equipment itself may be distorted with respect to the actual operational environment.

Hence, current debugging methodologies (including those for transceivers such as Bluetooth) are resource intensive, and do not scale well for quick checkups, factory tests, and user maintenance scenarios where there are limited test or other resources.

Exemplary Software Architecture—

Referring now to FIG. 1, one exemplary embodiment of the generalized software architecture 100 useful for debugging "encapsulated" component issues (such as for example the problems presented by Bluetooth wireless transceiver installations as referenced above) is now described in detail. It is noted that the term "debug" as used in the present context refers generally to problem identification, diagnosis and/or correction, whether related to software, firmware, and/or hardware, and is in no way limited to traditional software debugging (i.e., evaluating computer programs for defects, logical flaws, incompatibilities, etc.).

As shown in FIG. 1, the primary operative elements of this architecture 100 are the functional software "stack" 102, a corresponding debug software test suite 104, a Diagnostic Test Suite Manager (DTSM) application 106, and a user interface 108. As used herein, the term "application" refers generally to a unit of executable software that runs in a predetermined environment and implements one or more functions and/or themes.

The exemplary functional software stack 102 of FIG. 1 comprises a Bluetooth modem having multiple hierarchical layers of modem software (e.g. PHY 102A, AND application 102B). It will be recognized that these "layers" and "stack" 102 may not necessarily correspond to layers of conventional software models such as the well known OSI model (i.e., having physical, link, network, transport, session, presentation, and application layers), but rather are merely meant to illustrate different logical strata or functionality within the exemplary device architecture. Moreover, the functional stack 102 may have more or less layers or components than illustrated.

The "functional" software stack 102 of the embodiment of FIG. 1 is a set of software subsystems or components which collectively deliver a fully functional software capability (e.g., for a Bluetooth modem). While the stack 102 is shown as a hierarchical structure, it is appreciated that other structures are equally suitable for use with the present invention. For example, many software architectures, commonly used within the software development arts, maintain strict limitations on data structures and data transfer. In one example, object oriented programming languages (e.g. C++, Java, etc.) have capabilities to maintain private and public class functions, which limit other external access to internal data structures.

The PHY (physical) layer 102A of the exemplary architecture 100 of FIG. 1 is substantially involved in interfacing the Bluetooth modem with the physical transport medium (i.e., air interface). Such interfacing activities include establishment and termination of radio frequency communication, and modulation and conversion between the representation of digital data in the Bluetooth module and the corresponding signals transmitted over the radio channel.

The application layer 102B of the functional software stack 102 is substantially involved in transportation of data and the detection and possible correction of any errors that may occur in the Physical Layer. Such activities may include bit error detection and correction, appropriate framing and data flow control. The application layer of the illustrated stack 102 is concerned with data flow without any concern for overall system requirements.

The exemplary debug software test suite 104 comprises a plurality of individual test processes 104A-104B which corresponds generally to the layers of the functional software stack 102. Specifically, the debug software test suite 104 of FIG. 1 comprises a PHY test/monitor process 104A, and an application test/monitor process 104B. The debug software test components 104A-104B of the exemplary embodiment are specific to the manufacturer of each (Bluetooth) module or subcomponent. It will be appreciated however that these test suites may comprise "stand alone" software (i.e., that which is provided with the module but run on an external device such as the CPU of the host), or software integrated with or indigenous to the module itself (e.g., run on an IC within the device).

While the debug test suites are shown in FIG. 1 as directly corresponding with corresponding modem layers of the functional stack 102, it is appreciated that each test component 104A-104B may encompass multiple layers or subsets of layers of the entire functional software stack 102. Furthermore, while the diagnostic test components 104 are shown with respect to only a single functional software stack, it is appreciated that any number of components or modules could be concurrently monitored and/or tested (e.g., a WLAN functional stack within the same device). In fact, in at least one detailed test procedure described herein, a Bluetooth modem and a Wi-Fi™ modem are simultaneously engaged to perform platform measurement tests.

As shown, the Diagnostic Test Suite Manager application 106 is also logically coupled to a User Interface or UI (e.g., GUI) 108, as well as the functional stack 102 via the illustrated interface 130. It will be recognized that the term "user interface" as used herein may refer to, without limitation, any visual, graphical, tactile, audible, sensory, or other means of providing information to and/or receiving information from a user or other entity. For instance, the UI might comprise a touch-screen device capable of both display and receipt of input. Alternatively, the UI might include a display (e.g., TFT, LCD, plasma, CRT, etc.) and a separate input device such as keyboard and/or mouse, joystick, thumbwheel, light pen, etc.). Myriad different combinations and configurations of UIs are well known to those of ordinary skill in the computer arts, and accordingly not described further herein. In the exemplary embodiment, the GUI display is a windowed display, having an assortment of various parameter pull-down menus, textual I/O, icons, and graphical plots. See FIG. 4 referenced subsequently herein.

In the architecture of FIG. 1, the DTSM 106 interfaces with the GUI 108, and controls the operation and/or display of one or more of its connected debug software test/monitor modules 104A-104B. The DTSM 106 is adapted to cause display of the status and/or output of any given diagnostic test simultaneously. Thus, the DTSM provides the user with a quick and readily cognizable interface for monitoring, testing, and controlling various components (such as the Bluetooth modem and WLAN interface) of the converged host platform.

In one implementation, the illustrated DTSM 106 of the architecture 100 of FIG. 1 comprises a number of functional modules, including: (i) a monitoring module configured to monitor AFH channel mapping, RSSI (relative and raw), and Tx power; (ii) a traffic module configured to send data packets over connection to determine the data rate (e.g., ACL data packets over an LSCAP connection); (iii) a signal generator module to initiate a single tone transmission mode; e.g., according to a Tx power level setting that is pre-set or set manually by a user; (iv) a signal receiver module configured to initiate a single tone receiver mode, receive the signal from the transmitter and monitor RSSI; (v) a platform noise measurement module configured to collect platform noise anecdotally (e.g., upon the occurrence of a given event or circumstance) or periodically, and report the noise level to another process or module; and (vi) a radio frequency parameter module configured to allow a user (or another software process) to set Bluetooth RF parameters; e.g., set different transmitter power levels, set the Bluetooth device as "discoverable" or not, etc. These functional modules may make use in varying degrees of extant components 104A-104B within the test suite 104 (if present), or alternatively the test functions may even be included within the DTSM application 106 itself.

The illustrated DTSM 106 further comprises a system-level test module, which can orchestrate system-level testing and monitoring (which may also involve the individual components of the test suite 104 and the component functional software stack 102).

In the illustrated embodiment, functions performed by the DTSM (and test suite 104) can be described generally as "active" or "passive" in nature. Active functions induce or invoke particular actions or configurations within the Bluetooth modem components, while passive functions do not require any affirmative actions or reconfiguration, but rather only monitor select functions or parameters. Both active and passive functions may be performed for any of the functional stack 102 layers; i.e., PHY, application, or system.

Several of the specific functions enabled by the Diagnostic Test Suite Manager (DTSM) 106 and its constituent functional modules are summarized in Table 1 below:

TABLE 1

| DTSM Component | Passive Functions (Monitoring) | Active Functions (Initiating) |
| --- | --- | --- |
| Physical Layer | Received Signal Strength Indication (RSSI) Tx Power | Single tone frequency Tx mode Single tone frequency Rx mode Set Tx Power |
| Application Layer | Throughput Bit Error Rate (BER) Packet Error Rate (PER) Adaptive Freq. Hopping (AFH) channel Packet Transaction Logs | Bi-Directional Data traffic (e.g., Pseudo Random Bit Sequence) |

TABLE 1-continued

| DTSM Component | Passive Functions (Monitoring) | Active Functions (Initiating) |
| --- | --- | --- |
| System Level | Platform Noise WLAN/BT isolation Bluetooth Antenna Pattern | Set Bluetooth in constant Tx mode with specified channels to skip Enable/Disable "Discoverable" feature |

Figure 1A:
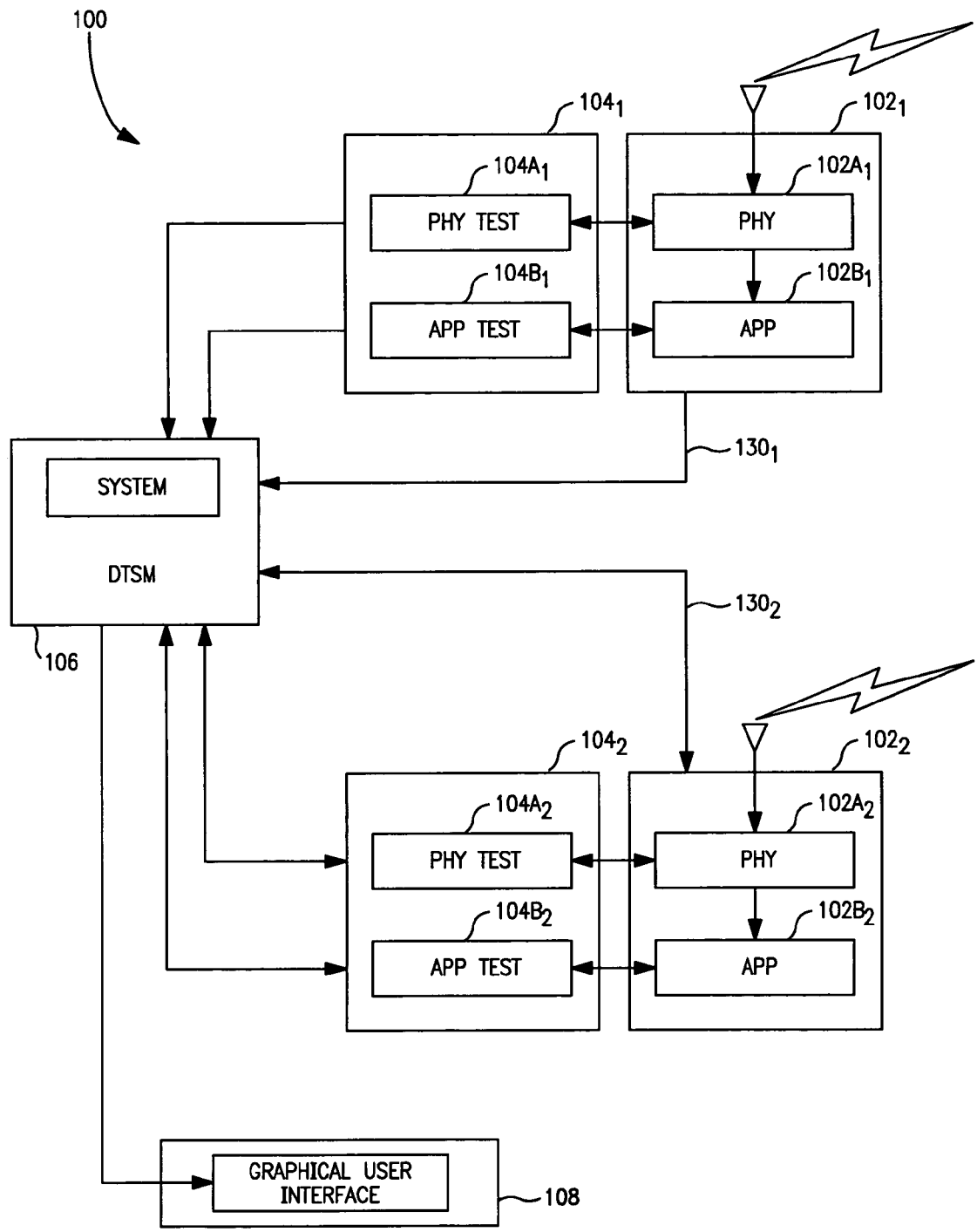
FIG. 1A is a block diagram illustrating a second embodiment of a software architecture comprising multiple functional software stacks coupled to a Diagnostic Test Suite Manager (DTSM), in accordance with the principles of the present invention.

As shown in FIG. 1A, the architecture 100 may also include a second (or more) component module $102_2$ for evaluation and testing by the DTSM and a second test suite $104_2$. Here, the DSTM monitors and controls both "encapsulated" components whether in isolation or simultaneously, and can further evaluate the operational or design problems with one or the other (or both) by common analysis of both.

Apparatus—

Figure 2:
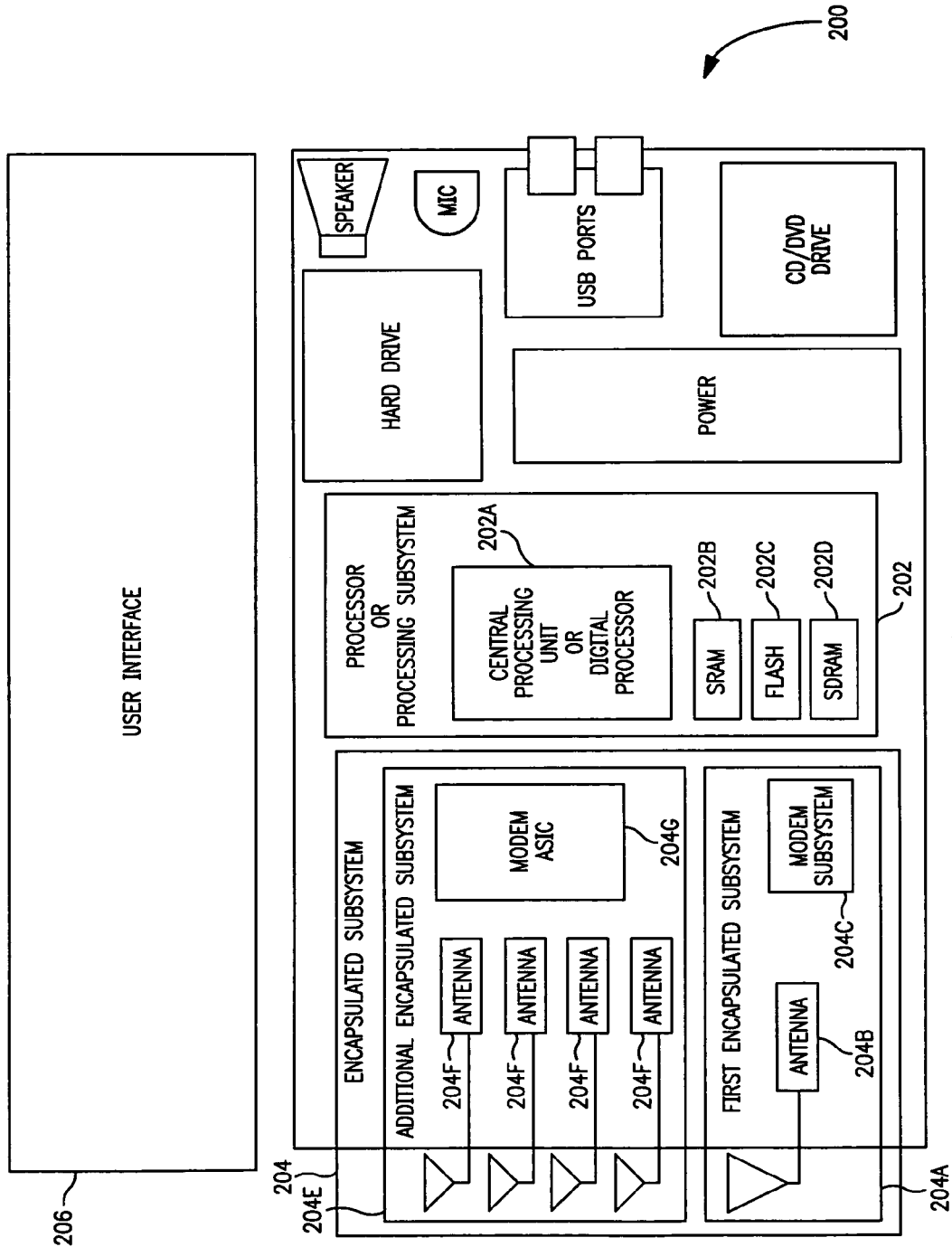
FIG. 2 is a block diagram of an exemplary embodiment of a converged host or client apparatus incorporating at least one "encapsulated" component module, in accordance with the principles of the present invention.

Referring now to FIG. 2, an exemplary apparatus 200 integrating multiple test suite capabilities is depicted. While a specific device configuration and layout is shown and discussed, it is recognized that many other implementations may be readily implemented by one of ordinary skill given the present disclosure, the apparatus 200 of FIG. 2 being merely illustrative of the broader principles.

In the illustrated embodiment, the apparatus 200 comprises a wireless host or client such as a portable (laptop or handheld) computer, or mobile communications device (e.g., cellular phone, 3G "UE" or smartphone, PDA, etc.) capable of dynamically monitoring one or more functioning software stacks 102 (FIG. 1), and modifying one or more component behaviors simultaneously. In this exemplary implementation, the monitoring functionality is performed within a concurrently operational Diagnostic Test Suite Manager (DTSM) 106 running within the host processor (e.g., CPU) of the device. It is appreciated that in other implementations, the monitoring functionality may be performed within a separate processor, or processing device (e.g., processor on a peripheral of the host, or within an external test device coupled to the host via a data bus or other interface).

As shown in FIG. 2, the client apparatus 200 comprises a processor 202, at least one encapsulated subsystem 204, and a user interface 206.

The processing subsystem 202 includes a central processing unit (CPU) or digital processor 202A, such as a microprocessor, digital signal processor, field-programmable gate array, array processor, or plurality of processing components mounted on one or more substrates. The processing subsystem is tightly coupled to operational memory which may include for example SRAM 202B, FLASH 202C and SDRAM 202D components. The processing subsystem may also comprise additional co-processors (not shown), such as a dedicated graphics accelerator, network processor (NP), audio processor, or even a dedicated DTSM monitoring co-processor.

The processing subsystem 202 is adapted to execute software applications such as the DTSM (or even portions of the functional software associated with the component stack 102).

The processing subsystem 202 is additionally adapted to execute the Diagnostic Test Suite Manager (DTSM) application 106, described in greater detail elsewhere herein. The DTSM application 106 is coupled to the encapsulated subsystems 204, such as via a dedicated out-of-band connection, bus, wireline connection, or other approach. In one exemplary implementation, the DTSM application 106 is coupled to the encapsulated subsystems 204 via a first interface operating the USB protocol. Alternately, in another exemplary implementation, the interface is PCI based.

The encapsulated subsystem 204 shown in FIG. 2 comprises one or more components which are adapted to perform a specific function to augment or offload the capabilities of the processing system (e.g. a modem, a graphics processing subsystem, video camera subsystem, etc.). In one embodiment, the encapsulated subsystem is a wireless modem implementing a Bluetooth wireless modem stack (functional stack 102 of FIG. 1). As previously noted, multiple encapsulated subsystems may be simultaneously monitored by the DTSM. For example, for multi-mode devices, an encapsulated subsystem may combine multiple independent subsystems (such as dual/multi-mode radio systems), or alternatively multiple distinct encapsulated subsystems may be present within the host 200 (e.g., a Bluetooth radio and a WLAN radio), as described in greater detail below.

Each encapsulated subsystem 204 of the host 200 provides one or more test interfaces, each of which provides at least limited access within that subsystem. The test interface may accept simple bus transactions. Alternatively, the test interface may constantly stream data.

As illustrated in FIG. 2, a first exemplary encapsulated subsystem 204A comprises a Bluetooth radio/modem subsystem having a radio and modem assembly. Such components may be combined within a single package, or alternately implemented within physically discrete components. As shown, the radio/modem subsystem typically comprises an antenna 204B. The modem subsystem 204C is implemented as a single modem ASIC. In some modem subsystems, the peripheral devices associated with radio transmission, such as a Power Amplifier (PA), and power management (such as a Low DropOut (LDO) Regulator), may be discrete components (i.e., separately packaged from the modem IC).

Additionally, in the illustrated embodiment, one or more additional encapsulated subsystem(s) 204E may coexist on the host device. As shown, the additional subsystem 204E comprises a radio/modem system comprising separate antennas 204F, and modem ASIC 204G. A typical wireless handheld device (such as the exemplary iPhone™ device manufactured by the Assignee hereof) may possess a variety of different radio transceivers or modems such as: a cellular interface (e.g., 3G UMTS and/or General Packet Radio Service (GPRS)), a WLAN (e.g., Wi-Fi™) interface, and a PAN (e.g., Bluetooth) interface. Use of a WiMAX interface (IEEE Std. 802.16) is also contemplated.

As previously described, the user interface system 206 may include any number of well-known I/O devices including, without limitation: a keypad (not shown), mouse (not shown), touch pad (not shown), touch screen (not shown), LCD or TFT display 206, backlights, LEDs, speaker, and microphone.

In the illustrated configuration of FIG. 2, the area in the immediate vicinity of the encapsulated subsystems 204A and 204E is potentially very noisy due to, inter alia, operation of one or both air interfaces, as well as the potential existence of other noise produced by e.g., disk drives, electrical power supplies, and other components within the host (e.g., the processor components 202 may create significant amounts of switching noise).

Methods—

Figure 3:
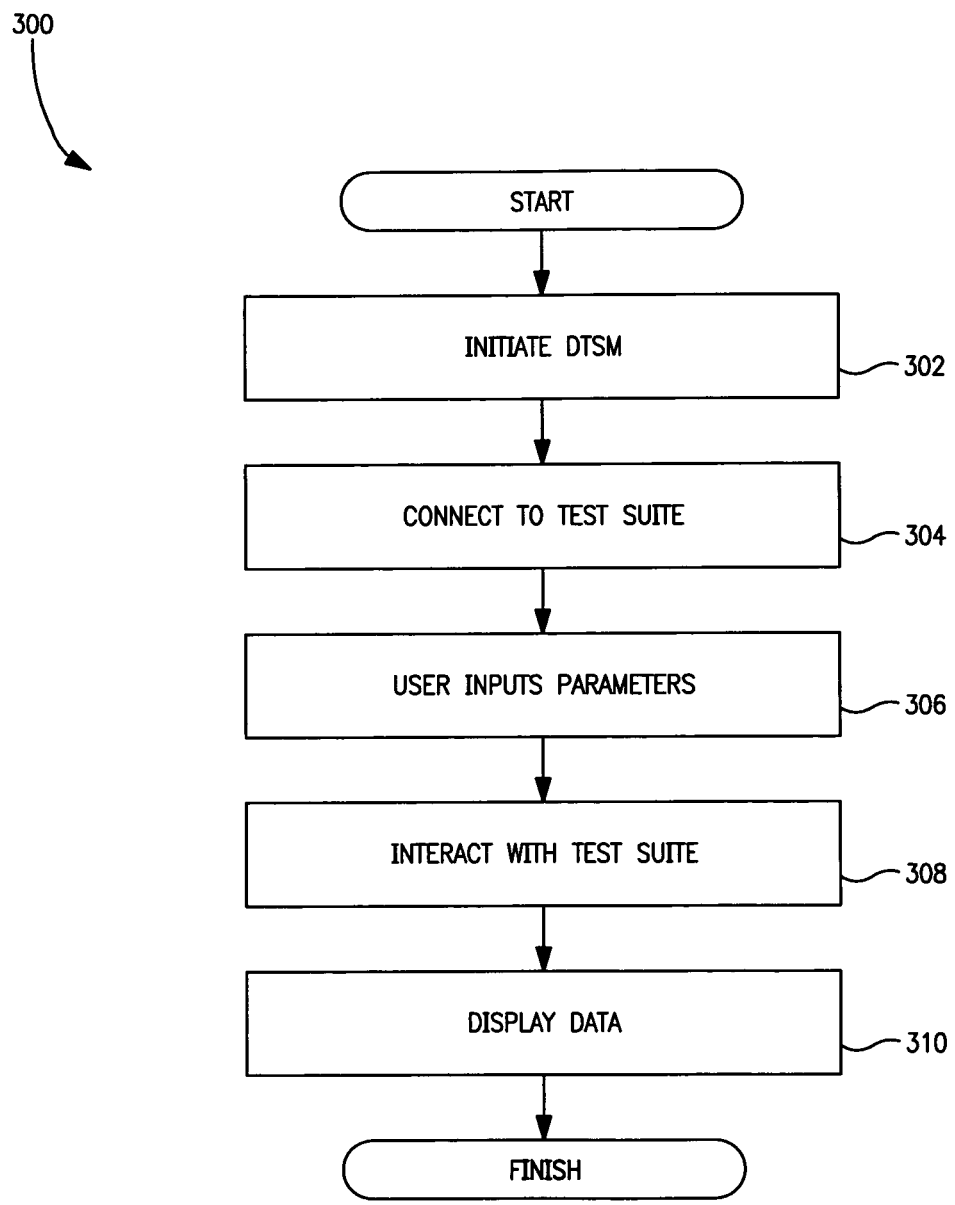
FIG. 3 is a logical flow diagram of an exemplary embodiment of the generalized process for simultaneous multivariate analysis of an encapsulated module, in accordance with the principles of the present invention.

Referring now to FIG. 3, one embodiment of the generalized method for integrating multiple test applications or suites for multivariate analysis 300 is depicted. As previously noted, the method of FIG. 3 is in no way limited to Bluetooth technology (or even wireless devices), the description of Bluetooth herein merely being for purposes of clarity and illustration.

As described herein, the exemplary implementation of the method of FIG. 3 comprises executing the DTSM application 106 on the apparatus 200 via the processing subsystem 202. The DTSM 106 interfaces with the one or more encapsulated subsystems 204 as well as any indigenous test software 104 (or alternatively incorporates such test software itself).

At step 302 of the method 300, the diagnostic test suite manager (DTSM) application 106 is initiated. In one embodiment, the user clicks on an icon or menu entry which is presented upon a virtual desktop or within an operating system menu structure on a graphical user interface.

Alternatively, such initiation may be performed by insertion of a hot-pluggable device such as a USB key dongle, CD ROM, etc.

In yet other related variants, the DTSM application 106 is automatically initiated at power up, or initiated periodically (e.g. on a daily basis). Alternatively, at least portions of the DTSM may run in the background, and active initiation of functions may be automatically triggered by one or more conditions occurring such as data or logged errors within the monitored subsystems (e.g., Bluetooth functional stack 102), or monitored values falling below a designated threshold, etc.

At step 304, the DTSM 106 accesses the functional software stack 102 of one or more of the encapsulated modules 204 via that module's indigenous test and monitor suite 104 (or the standalone software as previously described). In one embodiment, the test suites are independent and autonomous processes operating on multiple hierarchically organized layers. In one such variant, the DTSM application 106 operatively couples to a physical layer suite 102A and an application layer suite 102B using appropriate monitoring software using the PHY test/monitor module 104A and application test/monitor module 104B (and system level test/monitor module within the DTSM), respectively, as shown in FIG. 1.

The physical layer test suite 104A may for example comprise processes having control and or monitoring attributes associated with physical layer operations. See Table 1 above. Physical layer operations generally enable "physical" access to a transport medium, and include but are not limited to common Radio Frequency, and analog baseband operations. Common test processes and monitoring programs include: changing antenna gain, monitoring received signal strength indications (RSSI), etc.

The application layer test suite 104B may for example comprise processes controlling and or monitoring associated with Bluetooth application operation. Some exemplary tests which fall into this category include: throughput, Bit Error Rate (BER)/Packet Error Rate (PER), Automatic Frequency Hopping (AFH) Channels, packet logging, etc. Other more complicated "active" tests are also possible. The application layer may access or instigate "intelligent" or scenario-specific operation. For example, an application layer test may initiate Bluetooth traffic. Such a test may entail sending Bluetooth traffic in Asynchronous Connection-Less (ACL) packets over a L2CAP (Logical Link Control and Adaptation Protocol) connection.

The system level test suite within the DTSM 106 may for example comprise processes controlling and or monitoring attributes relating to system level interactions with the Bluetooth module (and other "encapsulated" modules being evaluated). Some test functions which fall within this category include: platform noise measurements, WLAN/BT isolation measurement, automated testing and reporting, and Bluetooth antenna pattern management, etc.

Moreover, while diagnostic test suite 104 are described herein, they should be considered illustrative of the general nature of diagnostic tests. In fact, test suites may encompass multiple automatic actions, decision trees, and or hierarchical layers, and may even include associated hardware and/or firmware components dedicated to testing and/or debug. The test suite 104 in the illustrative embodiment is hierarchically organized for a single functional software stack 102; however, the test suite(s) 104 may span multiple unrelated functions. In one such embodiment, test suites are included for Bluetooth, Wi-Fi™ and cellular radio functions. A common test suite may also be provided for various different modules or functions; e.g., one test suite which is "universal" in nature for Bluetooth, Wi-Fi and cellular interfaces of the host.

At step 306 of the method 300, one or more parameters are optionally received from the user via the user interface 108. In one exemplary embodiment, a series of various user interfaces (such as buttons, radio buttons, checkboxes, pull-down menus, sliders/scroll bars, text entry, etc.) of the type well known in the software arts enables the user to select, and or provide one or more input parameters to the DTSM application 106. In an alternative embodiment, each test suite 104 has a corresponding predefined set of parameters or routines which are stored on computer readable media (e.g., RAM or ROM), and fetched from memory for use.

At step 308, the DTSM application 106 interacts with the encapsulated functional software 102 via its specified test routines 104 (or directly via the interface 130 between the DTSM and the functional stack 102). In one exemplary embodiment, interactions between the DTSM and the test routines occur in a query-response fashion. Alternatively, the test routines may continuously stream data, whereupon the DTSM filters the data streams based at least in part on the parameters output from step 306. Yet other protocols may be used as well.

For example, in one variant, a scalar value such as Received Signal Strength Indication (RSSI) is selected to be output on a regular time interval, and subsequently displayed within the graphical user interface 108 (step 310 discussed below). In certain embodiments, the test suite 104 may have a designated query command. Responsive to receiving the query command, the test suite provides the RSSI value to the DTSM application 106. Conversely, in alternate embodiments, the RSSI may be continuously transmitted within a generalized status message. The DTSM 106 identifies the RSSI value, discarding irrelevant portions of the status message. In both examples, the DTSM reuses the test routines, messages, and data constructs of the encapsulated module, thereby leveraging prior development work.

At step 310, the output of the DTSM (e.g., test results, diagnostic information, etc.) are formatted for viewing via the user interface 108. In one exemplary embodiment, a series of various user interface mechanisms (such as windows, pie charts, ladder diagrams, histograms, graphs, channel maps, text, etc.) display to the user the status of each of the selected testing apparatus in real-time.

Exemplary Graphical User Interface—

The exemplary graphical user interface 108 of the invention (FIG. 1) is designed to integrate multiple levels of system monitoring hierarchy, and simultaneously display information from multiple sources, while remaining understandable and usable by its intended audience (e.g. system engineers and factory personnel, or even end users or customers if so configured). Accordingly, the exemplary DTSM application 106 accommodates fine adjustment of specific key parameters (such as setting the DUT to a specific transmitter power), as well as "pre-packaged" test capabilities and functions (such as initiating data traffic, stepping through a sequence of test steps or different settings, etc). Various degrees of functionality may be enabled at least in part upon certain factors, such as the relative skill level of the user, the relative degree of assembly of the host device (e.g., fully assembled, prototype or partial stage, etc.), one or more protective or security features, etc. Such limitations are advantageously implemented so as to prevent or mitigate, inter alia, intentional or unintentional damage of the device, and or interference with other devices.

Figure 4:
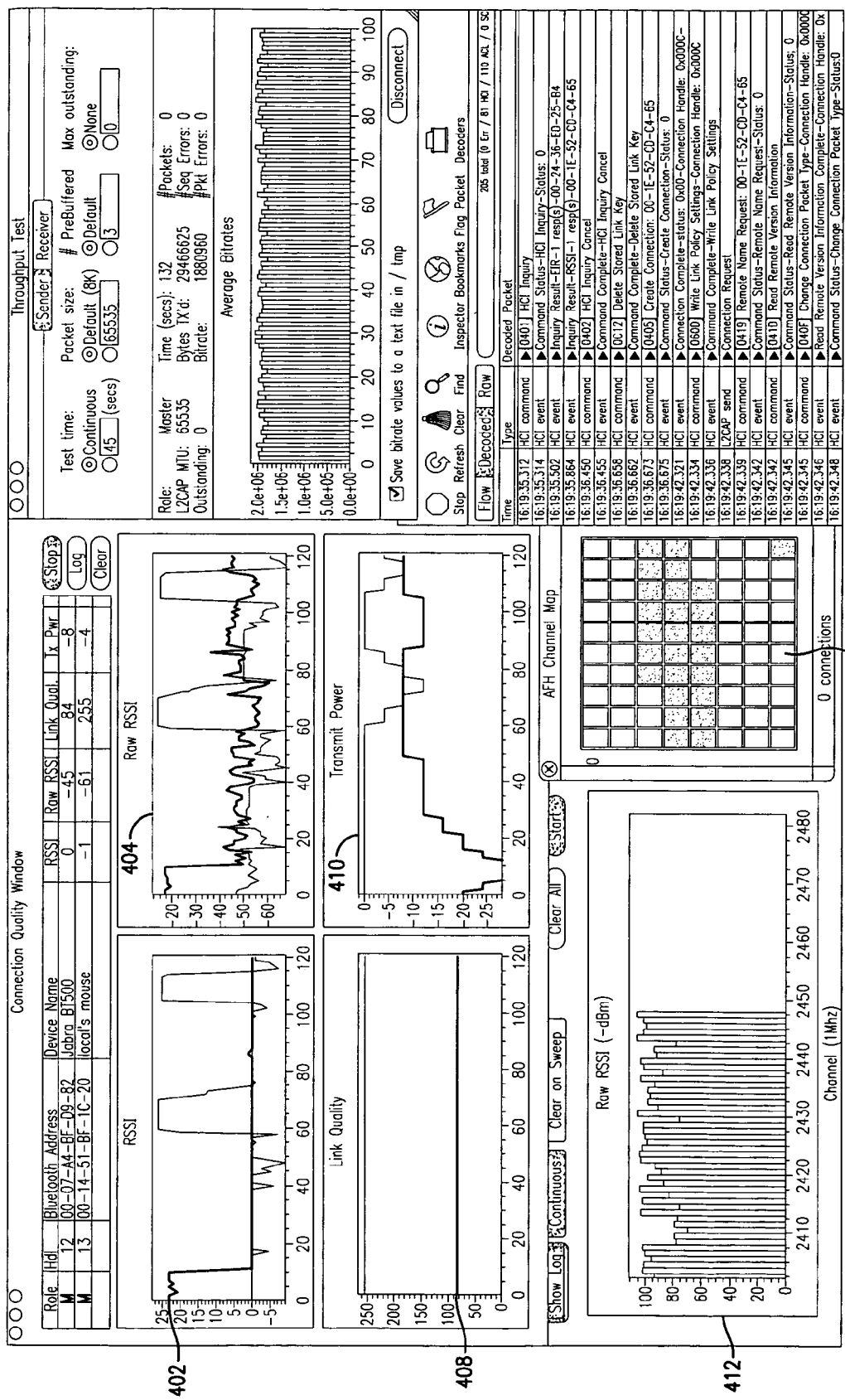
FIG. 4 is a graphical illustration showing an exemplary "screen shot" generated by one embodiment of the diagnostic test suite manager (DTSM) program of the invention while performing Bluetooth module testing.

Referring now to FIG. 4, one exemplary "screenshot" of a working embodiment of the Diagnostic Test Suite Manager GUI (configured for Bluetooth) is shown, illustrating dynamically changeable modem parameters, and visual multivariate analysis system.

The GUI display comprises an assortment of various parameter pull-down menus, packet logging, graphical plots, histograms and channel maps. The assortment of GUI elements spans multiple functional stack layers 102 via multiple test suite components 104A-104B, thus enabling multivariate diagnosis of performance issues. For example, the PHY layer 102A of the Bluetooth module functional stack provides a running measure of RSSI, which is displayed via a series of graphical plots 402, 404. The Bluetooth functional application layer 102B provides visual representation of an Automatic Frequency Hopping (AFH) Channel Map 406, and a series of pull down menus and/or text boxes enabling the setting of various parameters. Other parameters provided by the application layer 102B include information such as link quality 408, transmit power 410, and transmit power control (TPC) 412.

Example Test Procedure (Bluetooth)—

The following test procedure illustrates the operation of various aspects of the present invention. The disclosed test routines provide visibility into the internals of the device at multiple levels. Furthermore, the test routines advantageously do not require intrusive test equipment, but rather can operate entirely within the host device via the DTSM 106 and the indigenous test software 104.

The Bluetooth module 204 (see FIG. 2) is an encapsulated module with multiple fixed test interfaces (which may comprise for example physical elements such as pins on an IC, and/or virtual interfaces such as software, test protocols, etc.). The module itself has been thoroughly tested in isolation, and is assumed to be a bug-free device. Each test interface describes how the module and a corresponding internal constituent can be interacted with. Specific controlled test routines are provided by the Bluetooth module manufacturer. These pre-packaged test routines are incorporated into the DTSM 106 using simple "glue" code. The substantive code is inherited from the original developer, and is "hidden" from the DTSM software 106.

Multivariate analysis advantageously provides the user with multiple viewpoints of the same problem. Multivariate analysis of a Bluetooth module according to the present embodiment is performed in situ. Specifically, this multivariate analysis is not directed to optimizing, or fixing any singularly faulty Bluetooth component or software entity (although such capabilities are not precluded). Instead, the multivariate analysis of the invention is aimed at diagnosing the aggregate Bluetooth module's performance on multiple simultaneous levels, as a result of its installation and use environment.

Figure 5:
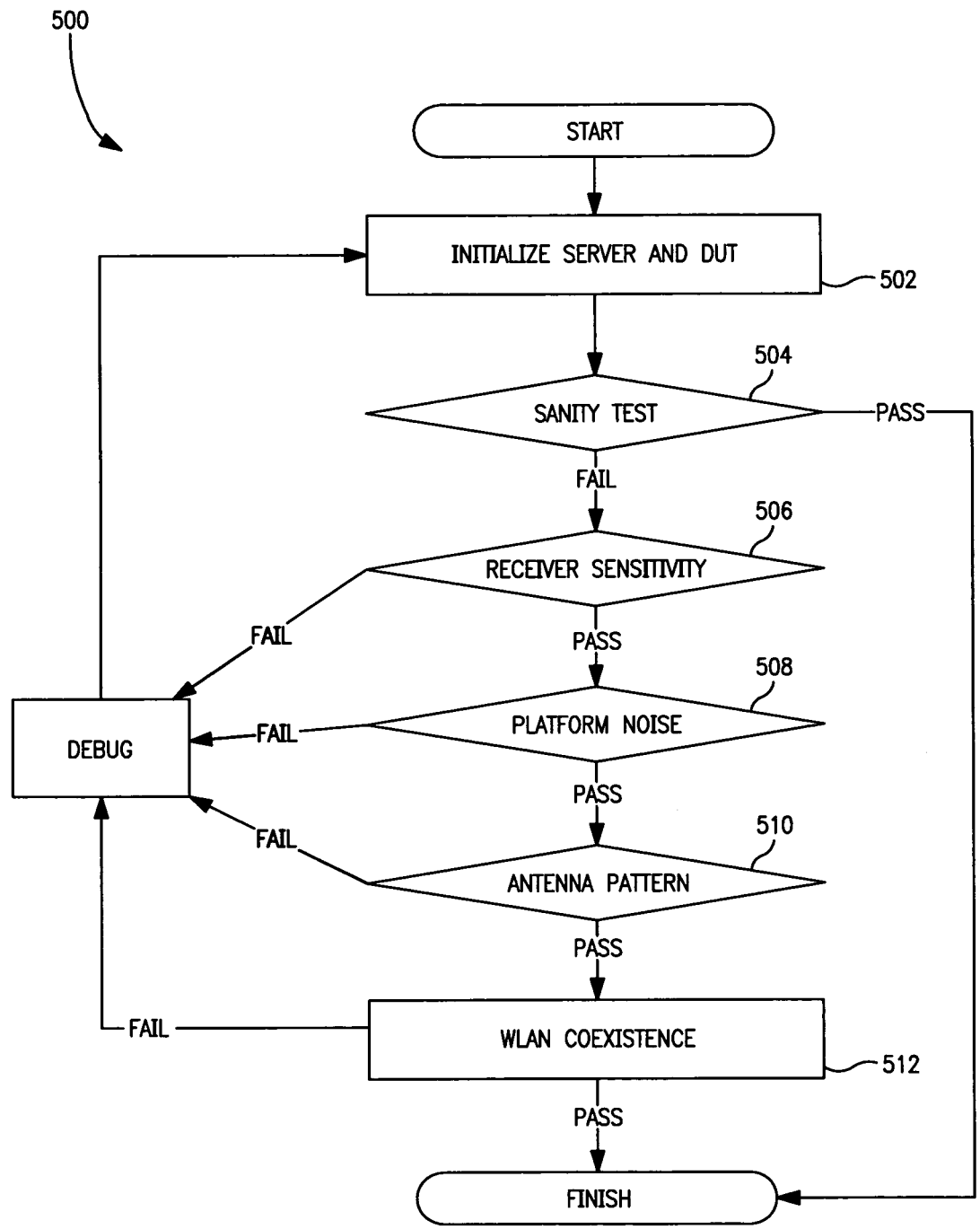
FIG. 5 is a logical flow diagram illustrating one embodiment of the integrated test procedure according to the present invention.

Referring now to FIG. 5, the following exemplary test procedure 500 is performed by a user operating the Bluetooth Diagnostic Test Suite Manager application 106. The foregoing example utilizes a series of encapsulated module test tools or suites 104, including for example: Packetlogger, Bluetooth Explorer, and Broadcom TestTool. Packetlogger tracks the high level packet exchanges between the host and the client. The high level packet exchange represents a dialog of the host-client interactions, including the data, and device states. Bluetooth Explorer is a Bluetooth modem diagnostic tool for tracking lower modem layer operations. Lower modem layer software can provide graphical monitors for displaying, inter alia, receiver sensitivity, the Automatic Frequency Hopping (AFH) map, transmitter power level, link quality, etc. The Broadcom TestTool is used to actively control and change the BT module's operation. The Broadcom TestTool can put BT module into DUT (device under test) mode to perform one or more diagnostic tests which are outside the range of normal operation. For example, the Broadcom TestTool can transmit a single tone, change between different packet types, set different power levels, etc.

At step 502, a first server (also referred to as the "golden" server) and Device-Under-Test (DUT) are initialized for system integration testing. The first server has a previously qualified Bluetooth module, and has been verified to represent near optimum Bluetooth operation. The Bluetooth DTSM application 106 is initialized within the DUT (e.g., host converged device) which is either undergoing current development, evaluation, or has been determined to be faulty.

At step 504, an initial functionality test is performed. During this "sanity test", the server initiates a simple but comprehensive test with the DUT. If the sanity test passes the design requirements, then the DUT has successfully passed. Ideally, the "sanity test" should simultaneously encompass as many possible subcomponents of the system as feasible, and return a simple "Pass/Fail" type result. In event of a pass response, the system has performed up to at least the minimum acceptable threshold. In the event of a failure, the DUT has one or more performance issues which require diagnosis.

One exemplary "sanity test" measures the data throughput between a golden server and the DUT. In this test, the server connects with the DUT, and if the throughput test passes the manufacturer's expected performance then the sanity test has passed. For example, the Bluetooth module will be expected to achieve a few hundred Kbps data transfer when separated from the golden server by approximately five (5) meters.

At steps 506, the DUT is tested for its receiver sensitivity and transmit power. These physical layer qualities may be displayed in simple graphs on the GUI (FIG. 4). If the receiver and transmitter of the physical layer are functioning correctly, then more comprehensive system level tests are run, which test the application layer in conjunction with physical layer of the functional stack 102.

One exemplary receiver test includes a GUI window (FIG. 4) providing interactive real time results. The GUI 108 displays RSSI (unit-less) 402, raw RSSI (dBm) 404, transmitter power 410, link quality 408, etc. The receiver test shows the dynamic fluctuations of RSSI of the golden server, as seen at the DUT.

An ideal DUT should indicate relative RSSI of approximately 0 (zero) at a separation distance of a few meters. A relative RSSI of 0 (zero) represents a raw RSSI of approximately −50 dBm to −70 dBm. Increasing the distance between the golden server and the DUT will cause a reduction in relative RSSI and raw RSSI. A relative RSSI of −20 (minus twenty) corresponds to a raw RSSI below −80 dBm. At these levels, the Bluetooth link will drop, and cease to operate. "Improperly" functioning DUTs generally start with relative RSSI lower than −20 (minus twenty), which seriously impacts performance.

One exemplary transmit test according to the method 500 includes setting the DUT to a single tone mode having a specified transmit power level, and monitoring the golden server's RSSI. Transmit power level settings may vary based on the device used. For example, one Bluetooth device may have eight (8) settings transmitter power levels. In another example, the Bluetooth module may have a gradient range between 0 dBm and −28 dBm. The golden server's RSSI will correlate closely with an ideal DUT's transmit power and path loss. A faulty DUT will show low RSSI at the golden server, even for very short separation distances. Other problems with antenna transmission can be manifested, such as e.g., poor correlation between transmit power and RSSI.

If either the transmit or receive tests fail, then the DUT is sent for further debugging which is focused on an appropriately narrowed area (e.g., analysis of components, power amplifiers, etc).

If both transmit or receive tests pass, then the DUT is sent for system level debugging.

At step 508, the DUT evaluates its platform noise profile (or at least portions thereof). Platform noise measurements are performed to determine the ambient noise level of the DUT itself. Thus, platform noise measurements are typically measured in a radio free environment, such as a "screen room" or Faraday cage. Furthermore, the DUT is tested in all physical configurations (e.g., clamshell modes for a DUT with a clamshell type housing) require platform noise measurements in both open and closed positions, and perhaps even intermediate positions). As previously discussed, traditional measurements of platform noise are performed with a spectrum analyzer. Since a spectrum analyzer is an expensive test element, a more efficient solution is desired and in fact provided by the present invention.

Specifically, the present invention leverages several operational assumptions and extant components of the DUT in order to provide a "virtual" spectrum analyzer of sorts. First, the DUT is already assumed to be fairly well optimized. Instead, the DUT must verify only gross functionality. In this exemplary test procedure 500, the DUT utilizes the existing Bluetooth or other radio to measure platform noise. Instead of connecting an external spectrum analyzer to the DUT, the Bluetooth receiver of the DUT sweeps through its channels recording appropriate noise measurements (i.e., via signals received in each frequency band via the external antenna). While the DUT measurements may not be precise, they are sufficient to identify troublesome frequency channels. In addition, the DUT can be programmed to simulate spectrum analyzer-like capabilities, such as maximum hold, average, etc.; such by way of the DTSM application 106. For instance, the DTSM may include a routine called "spectrum analyzer" wherein such functions can be selected by a user (e.g., via a menu or icon), and the Bluetooth receiver is subsequently programmed to perform such functions.

At step 510 of the method 500, the DUT tests its antenna pattern. The antenna pattern is generally assumed to be symmetric; however in actual implementation, this is rarely the case. The antenna may be occluded at certain angles by neighbor components, and or the device housing. Use of metallic housing may further exacerbate antenna asymmetries. Due to antenna directionality and the effects of the components and ambient environment around the antenna, a DUT must be tested in multiple physical orientations to ensure relatively uniform operation. Some use cases may be more forgiving than others, thus a DUT can acceptably operate with acceptably lower performance in these orientations (for example, a Bluetooth mouse generally is not operated in the vertical axis of or "overhead" a laptop). As with the aforementioned noise measurements, the various device configurations may also need to be considered (e.g., clamshell closed, clamshell open, etc.).

Figure 6:
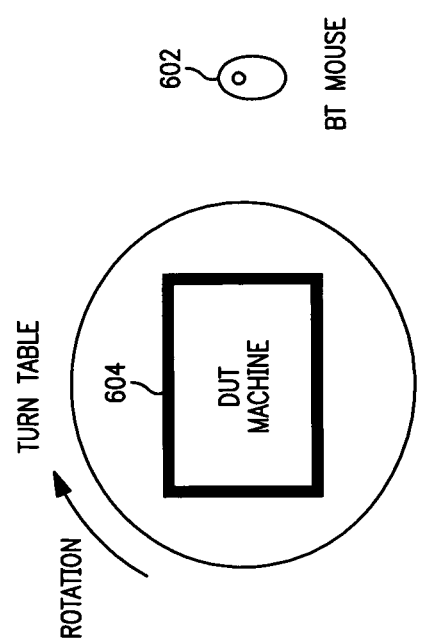
FIG. 6 is a graphical representation of one exemplary Bluetooth antenna pattern test protocol, where a DUT running the DTSM is rotated adjacent to a fixed Bluetooth transceiver, according to the present invention.

FIG. 6 illustrates one embodiment of an exemplary antenna pattern test protocol. In this protocol, the user rotates a DUT running the DTSM on a turntable next to a simple Bluetooth transceiver (such as a Bluetooth wireless mouse 602). The DUT 604 records a relative measurement (e.g. RSSI, BER) with the simple receiver's 602 corresponding position.

Figure 7:
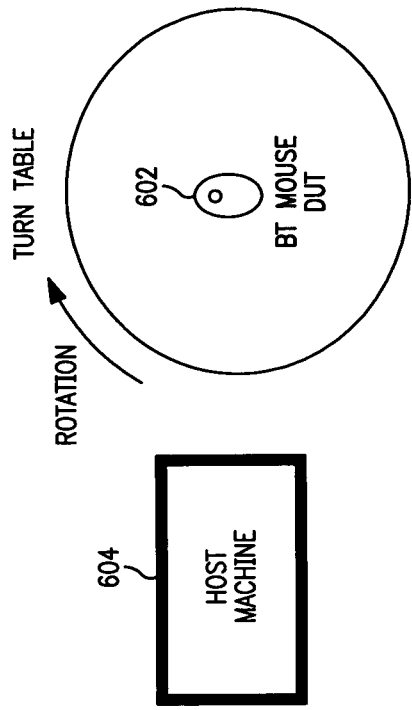
FIG. 7 is a graphical representation of one exemplary Bluetooth antenna pattern test protocol according to the present invention, wherein a DUT Bluetooth transceiver is rotated adjacent to a fixed host running the DTSM.

FIG. 7 illustrates a second exemplary antenna pattern test protocol, wherein the simple Bluetooth transceiver 602 is rotated next to the DUT 604 which is running the DTSM. As shown, the DTSM in this configuration facilitates the testing of another device (i.e., not the host device)

Figure 8:
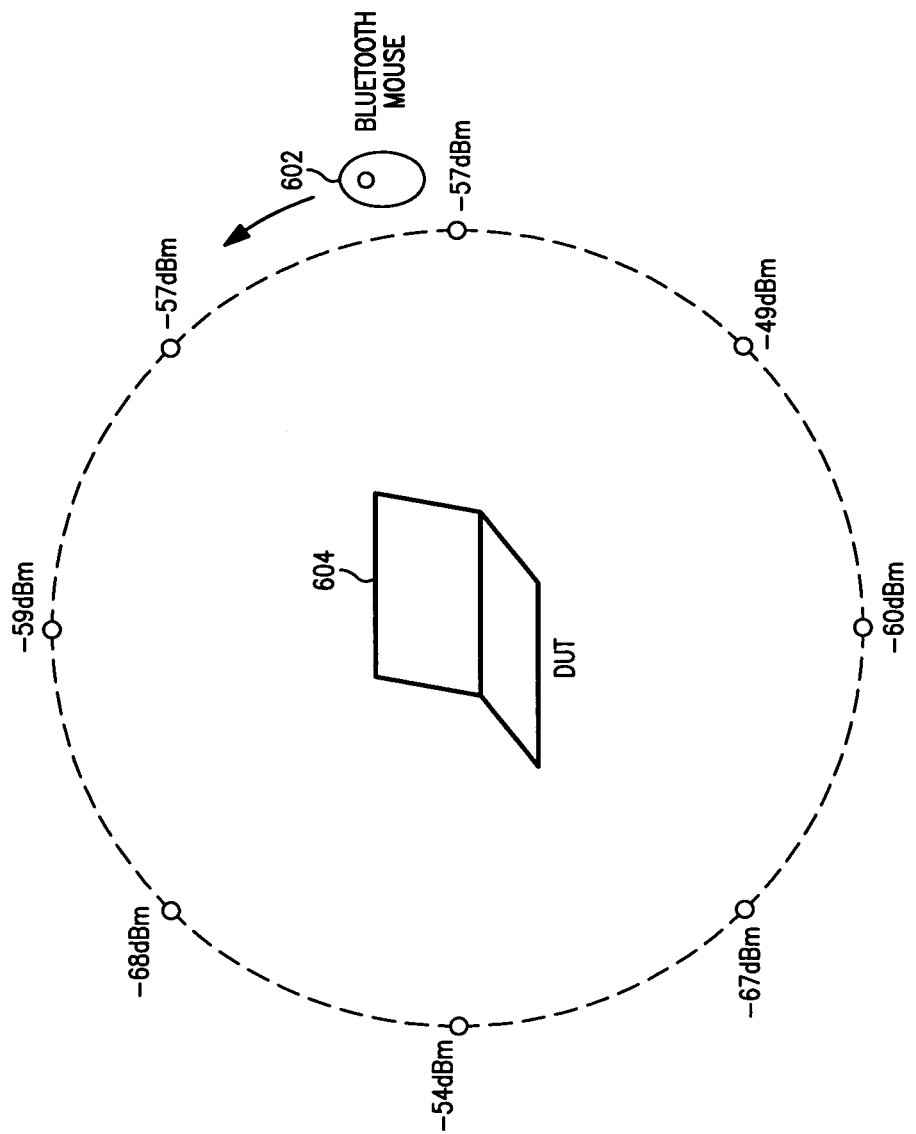
FIG. 8 is a graphical representation of another exemplary Bluetooth antenna pattern test protocol, where a Bluetooth transceiver is rotated around a fixed DUT.

Lastly FIG. 8 illustrates a third exemplary antenna pattern test protocol, wherein the simple Bluetooth transceiver 602 circumnavigates around the DUT 604. Generally, these disclosed tests are adapted to measure omni-directional RF antenna performance. In other embodiments, various other forms of test patterns may be used. For example, in a directional antenna (e.g. a pointable beam device), the angle of rotation may be significantly limited, and performance over greater distances may be monitored.

Figure 9:
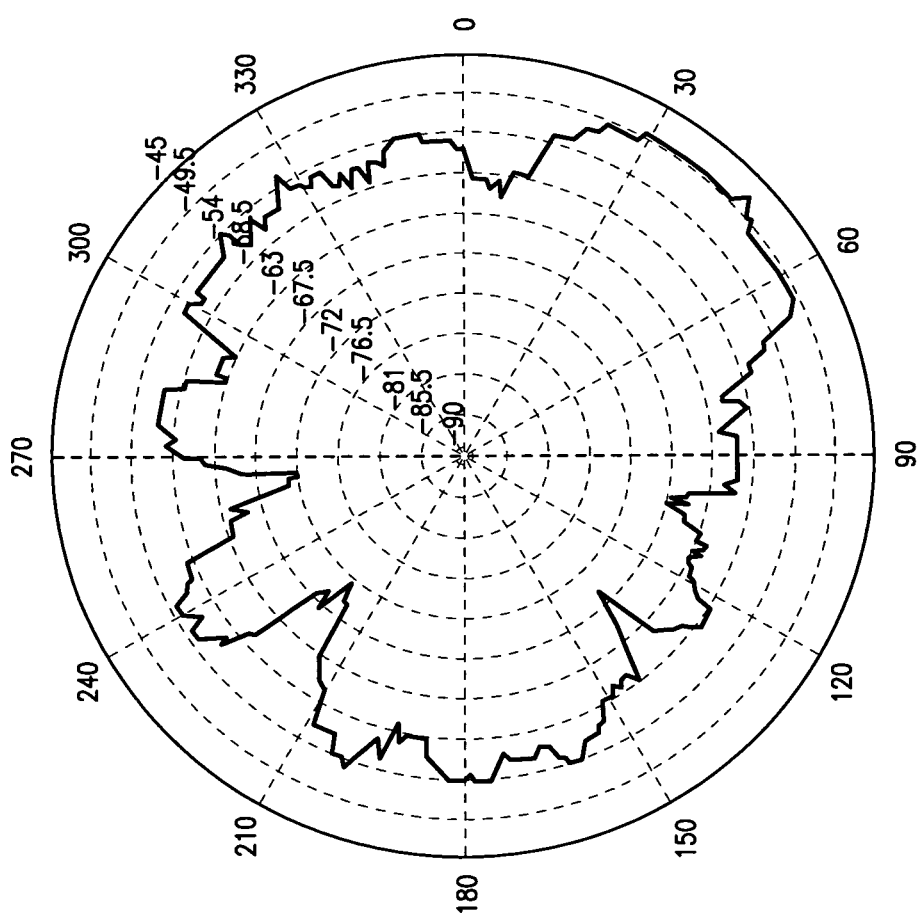
FIG. 9 is a typical antenna pattern or sensitivity plot obtained in situ using the protocol of FIG. 8.

Referring now to FIG. 9, an exemplary plot (taken from the antenna test pattern of FIG. 8) of the antenna sensitivity pattern (as installed within the DUT is shown. Note that antenna sensitivity plots in free space are implementation dependent, and may look quite different than that illustrated in FIG. 9, the latter being merely illustrative). As can be readily identified by those of ordinary skill, the plot of FIG. 9 does have certain "peaks and valleys" of RSSI; however, the overall pattern is that of a qualitatively "good" or desirable omni-directional antenna. Specifically, in this particular graph, the antenna reception only touches below −70 dBm, and average reception is an acceptable −55 dBm. It will be appreciated, however, that other qualitative and/or quantitative criteria for antenna performance may be utilized consistent with the present invention if desired.

Referring back to FIG. 5, at step 512, the DUT tests LAN/Bluetooth coexistence issues. In one variant of the method, the DUT powers on its wireless LAN, and then measures the received Bluetooth signal RSSI. If the DTSM application 106 supports both wireless LAN and Bluetooth simultaneously (e.g., embodiment of FIG. 1A described above), then both measurements (i.e. BT to WLAN, WLAN to BT) can be taken if desired, and evaluated.

Figure 10:
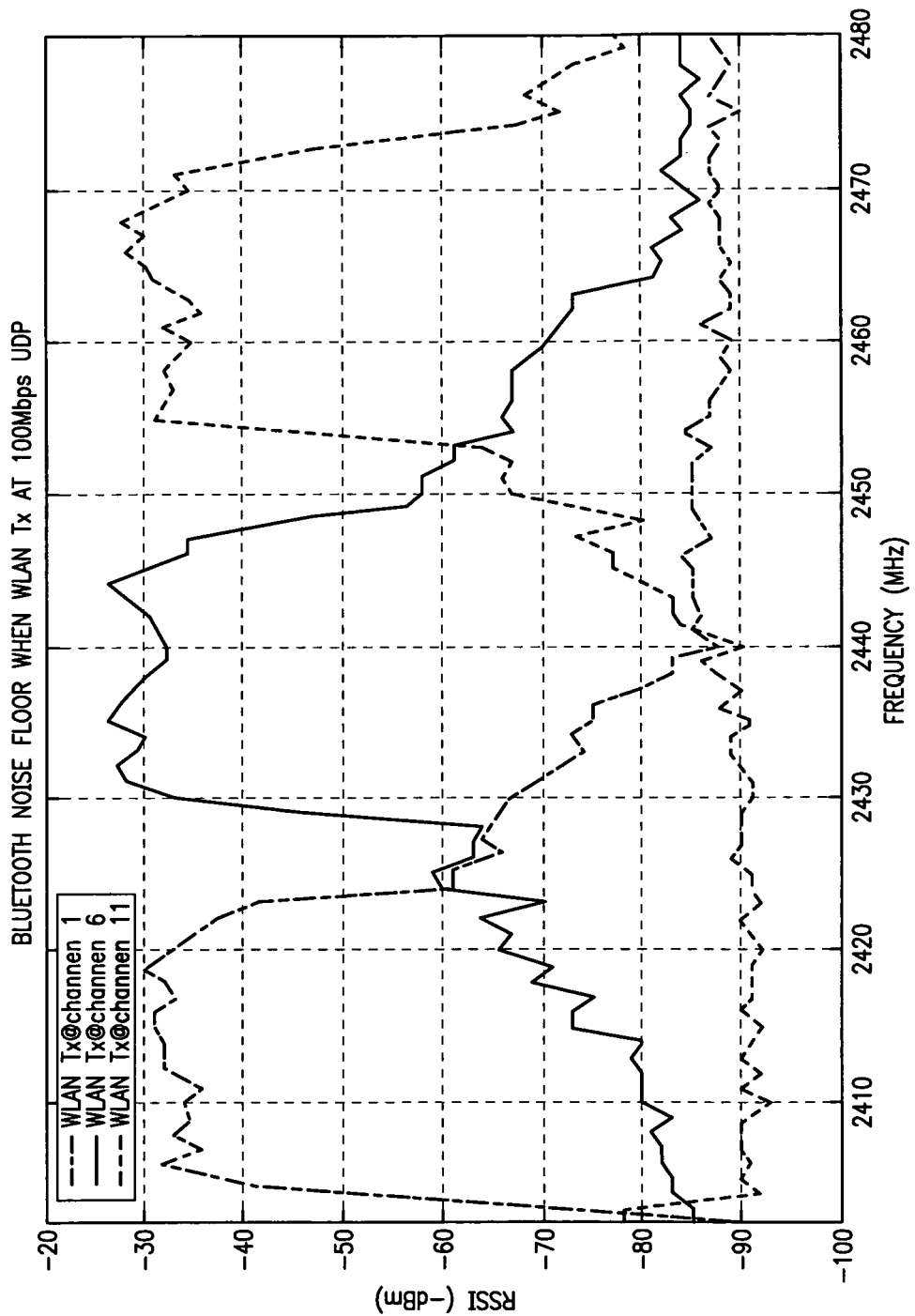
FIG. 10 is a graphical plot of Received Signal Strength Indication (dBm) versus Frequency (MHz), illustrating the noise floor detected at one exemplary Bluetooth WLAN convergence product, representative of the test results enabled by one or more aspects of the present invention.

Referring now to FIG. 10, a graph of one exemplary "noise floor" of a Bluetooth module based on WLAN Transmit Channel settings is shown. In this embodiment, the GUI 108 displays a detected raw RSSI (dBm) measured as a function of frequency. The WLAN modem is set at various channels (e.g., 1, 6 and 11 in the illustration), thus demonstrating the resultant overlap (and corresponding increase in resultant Bluetooth noise floor). As can be readily seen, the plot of FIG. 10 illustrates substantially flat profiles (commonly known as "Bart's Heads") with steep drop-off shoulders. Such profiles are desirable, in that the steep shoulders can be easily avoided with relatively few bandwidth restrictions; gradually sloping shoulders interfere with a much wider bandwidth, greatly reducing usable bandwidth.

It will be appreciated that the test logic of the illustrated embodiment 500 may be permuted and/or iterated if desired. For instance, it may be desirable to eliminate certain steps (for instance, which may have been previously performed, or are otherwise not considered to represent fruitful areas of evaluation), or add other steps not described (such as a hybrid approach where a piece of external test equipment, if available, is used to "put a finer point" on some of the higher-level results obtained via the DTSM 106. Changes to a component's configuration may be made, and a test step re-run (e.g., shutting off a disk drive or other peripheral, and then re-running the platform noise evaluation of step 508).

Also, switching between so-called "passive" and "active" tests (see e.g., Table 1) can be selectively performed if desired, depending on results received. For instance, switching to an active single-tone Tx or Rx mode after a passive RSSI measurement may be employed, or vice versa.

Many different variants of the foregoing will therefore be recognized by those of ordinary skill given this disclosure.

At the conclusion of the tests, the results are reported back to the system integrator for analysis. Based on the test results, a user can quickly ascertain which area of the Bluetooth module is malfunctioning.

Moreover, it will be recognized that the DTSM may be configured so as to include "artificial intelligence" such as one or more algorithms or routines which evaluate the results of testing (e.g., data output from the various test suite components 104A-104B, and/or the DTSM modules), and determine or suggest prospective causes or additional tests.

Business Methods—

In another aspect of the invention, methods of doing business relating to the capabilities of the foregoing Diagnostic Test Suite Manager (DTSM) application are disclosed.

In one embodiment, the capabilities enabled by the invention can be directly or indirectly marketed. For example, a system integrator can differentiate their product or service over others based on widespread technical support, and general robustness. In certain applications, the distribution of the DTSM may be performed over a publically accessible Internet service (e.g., a website or other such mechanism, which may also require that the user authenticate themselves and/or their particular device, such as via a product Serial No.). Alternatively, the DTSM may be sold directly, or licensed for external repair entities or facilities only. It may also be included as an application loaded onto the host device at time of purchase by an end user, akin to conventional anti-virus software tools loaded on PCs when shipped.

In one such example, a customer having established that they have a problem with their Bluetooth device may download the DTSM from a website. Upon running the DTSM, the customer may realize that the issue is not actually with the device itself, but rather the proximity of the device to a microwave oven, local wireless device, or other such interferer (e.g., something the customer may not have been aware of). The quick and transparent resolution of the issue for the customer greatly improves the perception of robustness and product value, likely influencing later product purchase decisions (as compared for example to sitting on a technical help line or chat with a technical representative attempting to diagnose a problem within the device itself that does not exist).

In another such example, a service technician may download the DTSM for diagnosis of a problematic system. Upon running the DTSM, the service technician may determine that system level tests are failing due to one or more physical layer problems. The service technician pays a prospectively higher license fee, to enable physical layer tests. The service technician, using the physical layer tests, determines that one or more components are faulty (for example, a discrete power amplifier), and quickly repairs it. The product producer or seller benefits in both i) reduction of its own field technician staff ii) licensing fees iii) improved customer perception of widely available support.

In another such example, the DTSM may be used as an education aid for science and technology students. The DTSM can be used by students for example to learn electromagnetic interference effects. With relatively minimal additional educational GUI material, the DTSM could be packaged with educational text, and "experiments". Anecdotally, the real-time experimentation, feedback, and animations (i.e., real experience) may further cement difficult RF concepts in the minds of students.

In yet another such example, the DTSM may be provided as a monitoring tool to a consumer. As different types of conflicting radio devices are becoming increasingly available, the resultant radio "pollution" can greatly affect performance. The DTSM can be used by a home or other premises (e.g., office) user to determine the best area within their home environment for device operation.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Computer readable apparatus having a non-transitory storage medium comprising at least one radio transceiver test program having a plurality of executable instructions associated therewith for testing at least a first and a second wireless interface located within a common device, the at least one radio transceiver test program comprising:
   a monitoring module configured to monitor at least one radio transceiver parameter of at least the first interface;
   a traffic module configured to determine at least one data traffic parameter of at least the first wireless interface;
   at least one of a signal generation or signal receiver module configured to cause generation or reception of a radio frequency signal of at least the second wireless interface, respectively; and
   a user interface in data communication with at least one of the modules, the user interface being configured to display at least one of the parameters of the at least first wireless interface thereon, the at least one of the parameters of the at least first wireless interface indicative of a possible co-existence issue between the at least first wireless interface and the at least second wireless interface at least partly in response to the generation or reception of the radio frequency signal of the at least second wireless interface.

2. The apparatus of claim 1, wherein the monitoring module is configured to monitor at least one of: (i) Adaptive Frequency Hopping (AFH) channel mapping, (ii) relative or raw received signal strength indication (RSSI), or (iii) transmit power associated with at least the first wireless interface.

3. The apparatus of claim 1, wherein the traffic module is configured to initiate a transmission of traffic over at least the first wireless interface.

4. The apparatus of claim 3, wherein at least the first wireless interface comprises a Bluetooth compliant transceiver, and the initiation of transmission of traffic causes Asynchronous Connectionless Link (ACL) data packets to be sent over an Logical Link Control and Adaptation Protocol (L2CAP) connection.

5. The apparatus of claim 3, wherein the traffic module is further configured to monitor log a data rate associated with the transmission of the traffic.

6. The apparatus of claim 1, wherein the at least one of a signal generation or signal receiver module comprises a signal generation module configured to initiate a single tone transmission, the signal generation module further comprising a function that enables manual selection of transmission power level.

7. The apparatus of claim 6, wherein the at least one of a signal generation or signal receiver module further comprises a signal receiver module configured to initiate a single tone receiving mode, and monitor a RSSI associated with at least one received signal.

8. The apparatus of claim 1, further comprising a platform noise measurement module configured to collect platform noise data.

9. The apparatus of claim 3, wherein at least the first wireless interface comprises a Bluetooth compliant transceiver, and the apparatus further comprises a module configured to set one or more parameters associated with the at least the first wireless interface.

10. The apparatus of claim 9, wherein the one or more parameters comprise: (i) transmitter power level, and (ii) Bluetooth discovery mode.

11. An electronic apparatus adapted to perform multivariate analysis of at least one operational function, the apparatus comprising:
   at least two wireless interfaces;
   a module, the module preforms the at least one operational function;
   a user interface;
   a processing device in operative communication with the module and the user interface; and
   a computer readable apparatus in data communication with the processing device, the computer readable apparatus comprising media having a computer program with a plurality of instructions which, when executed on the processing device:
      enable at least two substantially separate test processes associated with at least two wireless interfaces respectively, each of the at least two test processes adapted to interface with portions of the module;
      activate the at least two test processes for the at least two wireless interfaces via the module; and
      present output generated by at least one activated test process of the at least two test processes within the user interface to test for performance degradation of at least one wireless interface in response to the activated at least two test processes.

12. The apparatus of claim 11, wherein:
   at least one wireless interface of the at least two wireless interfaces comprises a Bluetooth compliant interface; and
   at least one test process of the at least two test processes comprises an RSSI test.

13. The apparatus of claim 11, wherein the device comprises a converged device having an at least partly metallic housing.

14. A method for debugging a converged electronic device comprising a plurality of wireless interfaces, the method comprising:

initiating at least two substantially separate test processes, each of the at least two test processes configured to interface to at least two respective wireless interfaces selected from the plurality of wireless interfaces;

placing the at least two test processes in data communication with the at least two corresponding wireless interfaces, respectively; and presenting the at least two test processes within a user interface simultaneously;

wherein the at least two test processes are configured to test for co-existence artifacts resulting from operation of the at least two corresponding wireless interfaces.

15. The method of claim 14, wherein the at least two wireless interfaces comprise a (i) wireless local area network (WLAN) interface and (ii) a Bluetooth interface.

16. The method of claim 14, further comprising:

performing a baseline test of the converged electronic device regarding at least one aspect of one wireless interface of the at least two corresponding wireless interfaces; and when the baseline test fails, performing at least one of:

(i) a receiver sensitivity test;

(ii) a device noise test; and/or (iii) an antenna pattern or sensitivity test.

17. The method of claim 15, further comprises performing a WLAN co-existence test.

18. The method of claim 16, wherein the performing at least one of comprises performing a receiver sensitivity test that comprises using a second device having a wireless interface capable of communicating data with at least one wireless interface of the at least two corresponding wireless interfaces of the converged electronic device being tested to transmit a signal at a known power level.

19. The method of claim 16, wherein the performing at least one of comprises performing an antenna pattern or sensitivity test that comprises placing a housing of the converged electronic device in various operational configurations.

20. The method of claim 16, wherein the performing at least one of comprises performing an antenna pattern or sensitivity test that comprises placing a second device having a wireless interface capable of communicating data with at least one wireless interface of the at least two corresponding wireless interfaces of the converged electronic device being tested in various angular dispositions relative to the device being tested, and recording received signal data relating to the various dispositions.

21. The method of claim 14, wherein the artifacts comprise co-existence conditions that degrade a performance aspect of at least one of the at least two wireless interfaces.

* * * * *